United States Patent [19]

Porta

[11] 4,132,460

[45] Jan. 2, 1979

[54] ELECTRICAL CONNECTIONS TO COIL WINDINGS

[75] Inventor: Gary D. Porta, Shiremanstown, Pa.

[73] Assignee: AMP Incorporated, Harrisburg, Pa.

[21] Appl. No.: 849,049

[22] Filed: Nov. 7, 1977

[51] Int. Cl.$^2$ .......................... H01R 13/60; H02R 3/50
[52] U.S. Cl. ................................... 339/119 R; 310/71
[58] Field of Search .................... 339/119; 310/71, 90, 310/259, 260

[56] References Cited

U.S. PATENT DOCUMENTS 3,457,442  7/1969  Charlton et al. ................ 310/260 X

*Primary Examiner*—Howard N. Goldberg
*Assistant Examiner*—E. F. Desmond

*Attorney, Agent, or Firm*—Frederick W. Raring

[57] ABSTRACT

An electrical connector housing which is intended to be mounted on a motor stator comprises a prismatic terminal housing portion having a flat base and having cavities therein for reception of electrical terminals. A supporting rib extends laterally from one of the sidewalls of the terminal housing portion and a surface is provided adjacent to the terminal housing portion for positioning the housing on one face of a stator with the rib extending laterally inwardly of the stator. The rib has clamping means on its inner end so that the housing can be clamped to the stator with the clamping means in engagement with surface portions of adjacent pole members of the stator.

7 Claims, 5 Drawing Figures

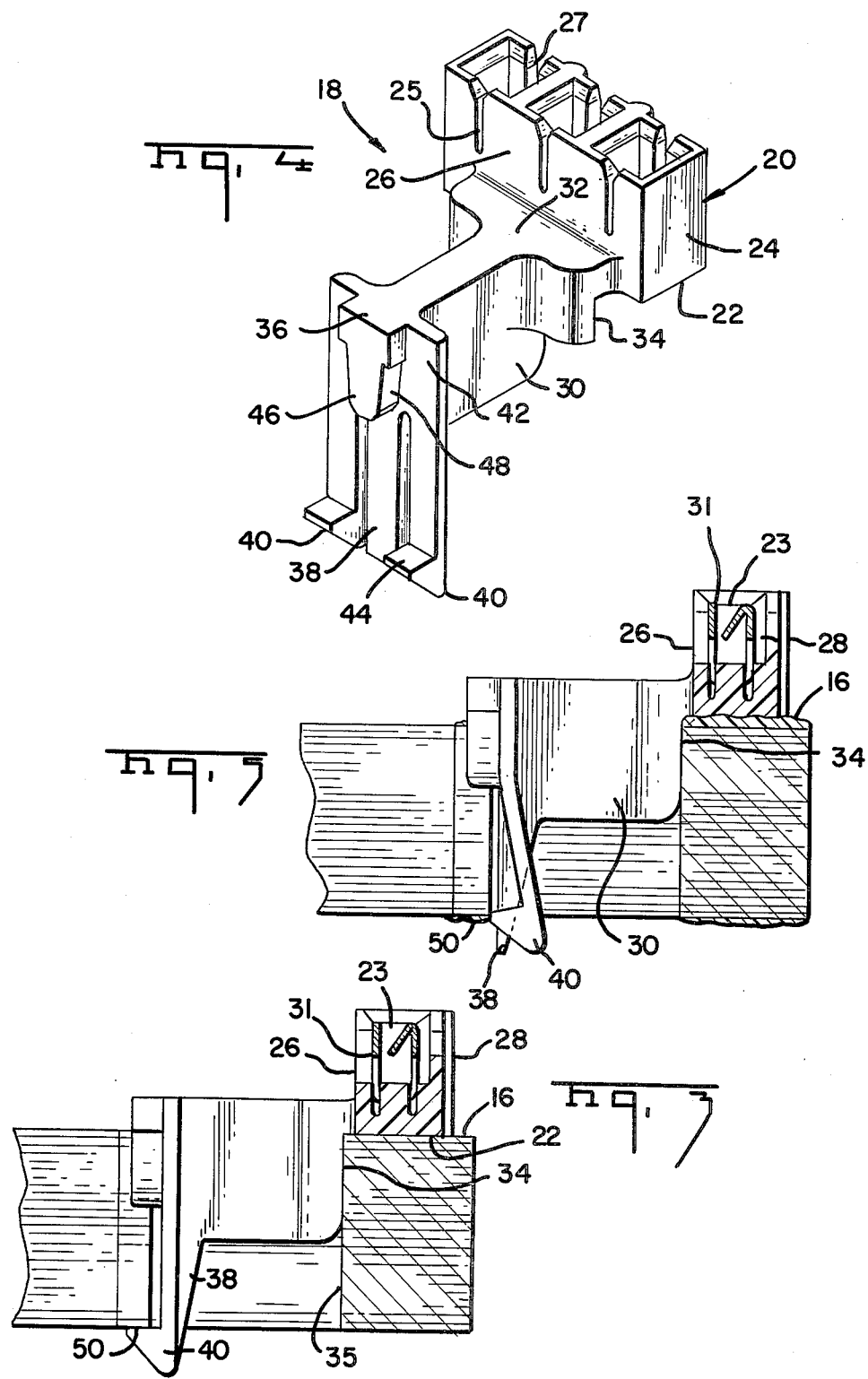

ELECTRICAL CONNECTIONS TO COIL WINDINGS

BACKGROUND OF THE INVENTION

This invention relates to connector housing means of the type which are intended for mounting on a stator of an electric motor. Housings of this general class have terminal receiving cavities in which the coil wires of the stator are positioned and which receive contact terminals so that the coil wires are connected to the terminals. The terminals further have provision for connection to conductors which extend from the stator. A variety of housing members of this type are in use in the motor industry; see, for example, U.S. Pat. Nos. 3,725,707 and 4,038,573.

The instant invention is specifically directed to the achievement of connector housing for a commonly used type of stator for a multi-pole electrical motor in which the faces of the stator are provided with an insulating coating of an epoxy resin or a similar material. The coatings provided on stators of this type are of varying and nonuniform thickness from one stator to another and these coatings furthermore vary in thickness from one portion of the face of the stator to another portion of the face. Because of the presence of this nonuniform coating, the stators do not have the dimensional precision which is usually associated with stamped metal parts and previously known types of connector housings can not be satisfactorily mounted on these stators.

In accordance with the principles of the instant invention, a connector housing is provided which has a terminal housing portion and a stabilizing rib which extends laterally from one of the sidewalls of the terminal housing. The free end of the rib has clamping fingers thereon which are dimensioned and contoured such that they will bear against portions of the pole members of the stator when the housing is located on one face of the stator with the rib extending inwardly towards the center of the stator. The clamping means on the end of the rib is such that the housing can be securely mounted on the stator even if the actual thickness of the stator varies widely from the nominal thickness thereof. The actual thickness will, of course, vary widely if the surface or face of the stator is provided with a thick and uncontrolled coating of insulating material.

It is accordingly an object of the invention to provide an improved housing which is intended to be mounted on the stator of an electric motor. A further object is to provide a housing which can be mounted on stators of varying thicknesses. A further object is to provide a connector housing which is intended for mounting on a motor stator having improved mounting means.

These and other objects of the invention are achieved in a preferred embodiment thereof which is briefly described in the foregoing abstract, which is described in detail below, and which is shown in the accompanying drawing in which:

FIG. 3 is a cross sectional view taken along the lines 3—3 of FIG. 2 illustrating the manner in which a housing in accordance with the invention is mounted on a stator under ideal conditions.

FIG. 4 is a perspective view of the housing.

FIG. 5 is a view similar to FIG. 3 but showing the manner in which the housing is mounted on the stator when the faces of the stator are covered with a relatively thick and nonuniform coating of insulating material.

Figure 1:
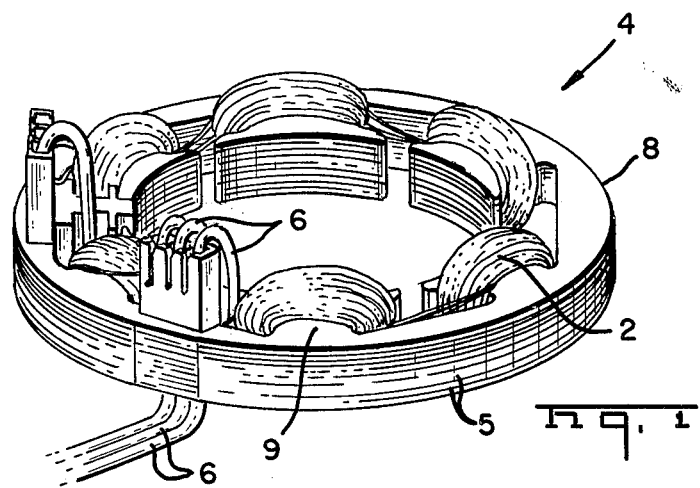
FIG. 1 is a view of a stator having connector housings in accordance with the invention mounted thereon.
Figure 2:
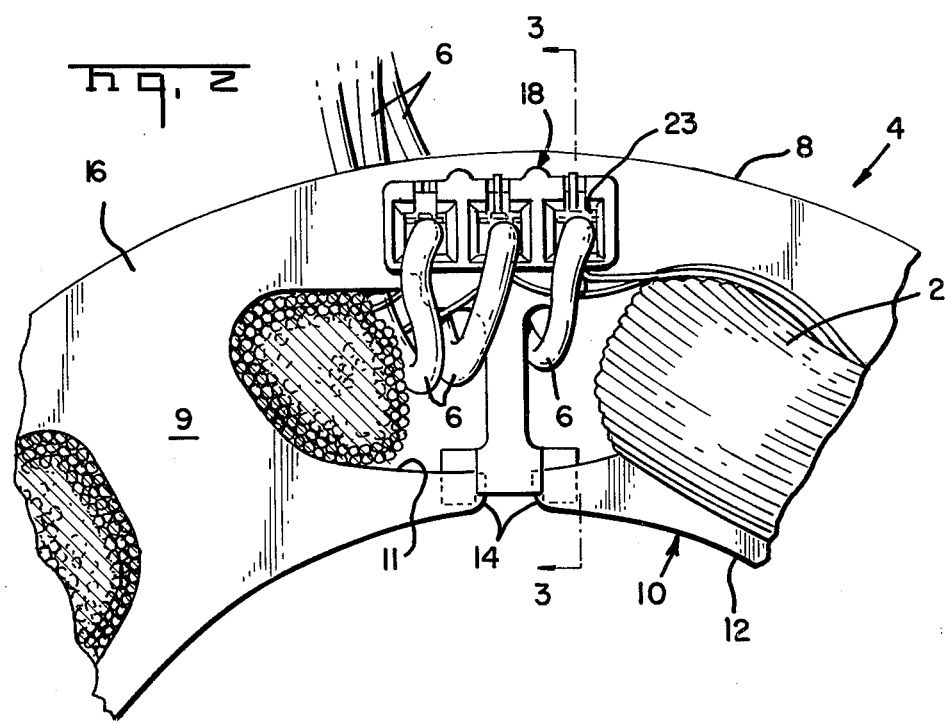
FIG. 2 is an enlarged fragmentary plan view of a portion of the stator shown in FIG. 1.

Referring first to FIGS. 1 and 2, a typical stator 4 of the type for which a housing in accordance with the invention is intended comprises a stack of identical steel stampings 5 and has a circular peripheral portion 8 from which spaced-apart necks 9 extend inwardly towards the center of the stator. The necks 9 have enlarged inner ends 10 which serve as pole sections and each pole section has a cylindrical inner face 12 so that these faces define the central opening in which the rotor of the motor would be located. The pole sections extend arcuately in each direction so that the ends 14 of adjacent pole sections are relatively close to each other and the rearward sides 11 of the pole sections are tapered towards the ends 14 as shown in FIG. 2.

The coil windings 2 extend around the neck portions 9 and to the housing means 18 which is described below. The purpose of the connector housing in accordance with the invention is to connect these windings to the external conductors 6.

The connector housing means 18 comprises a generally prismatic terminal housing portion 20 having a base 22, end walls 24, and sidewalls 26, 28 extending from the base. Terminal receiving cavities 23 extend into the terminal housing 20 from the upper end thereof and lead wire-receiving slots 25, 27 are provided in the inner and outer sidewalls 26, 28. As explained in the above-identified U.S. Pat. No. 4,038,573, the ends of the coil wires 2 are electrically connected to the external conductors 6 by locating the coil wires in the slots 25, 27 and inserting terminals 31 into the cavities 23. The terminals are designed such that they will be in electrical contact with the coil wires after insertion and the external conductors 6 are thereafter inserted into the cavities 23 and contacted by spring arms 23 of the terminals.

A clamping rib extends laterally from the inner sidewalls 26 and this rib has a generally rectangular central section 30. The rib is enlarged as shown at 32 adjacent to the sidewall 26 and is integral with this sidewall as shown. The enlarged portion 32 provides a supporting surface 34, FIG. 3, which extends substantially normally of the base 22 so that when the base of the terminal housing 20 is located on the face 16 of the stator, the surface 34 will be against the inner surface 35 of the stator and the rib 30 will extend laterally inwardly of the stator.

The end 36 of the rib has three fingers 38, 40 extending downwardly therefrom as viewed in FIG. 4, the outer fingers 40 having outwardly directed hooklike portions 44 on their ends and serve as clamping fingers as will be described below. The fingers thus extend normally of the plane of the base 22 in a direction which is opposite to the direction of the housing 20. As shown in the drawing, and as will be explained below, the fingers will extend through the stator when the housing is mounted on one face of the stator. The extreme end of the rib is provided with a boss 46 having a stepped width as shown at 48 in FIG. 4 to permit its being positioned between the ends 14 of adjacent pole members as will be explained below.

The housing means 18 is advantageously manufactured by injection molding of a suitable thermoplastic material such as a nylon composition which is relatively firm in thick sections but which is somewhat flexible in relatively thin sections so that the fingers 40 will flex relative to the central portion 30 of the rib.

In use, the housing 20 is assembled to the stator by simply locating it above the face 16 with the rib 30 extending towards the center of the stator. The housing is then moved downwardly to the position shown in FIG. 3 until the base 22 of the terminal housing is on the face 16 and the hooklike ends 44 of the fingers are disposed against the downwardly facing surface portions 50 of the adjacent pole members. After the housing has been mounted on the stator in this manner, the sides 48 of the boss 46 will be disposed against the ends 14 of the adjacent pole members and the housing will be firmly in place on the stator. The coil wires can then be located in the slots 25, 27 and the terminals inserted into the cavities to make the necessary electrical connections. The center finger 38 serves the function of closing or blocking the gap between the ends 14 of the pole pieces so that the wires can not be moved into the center of the stator.

FIG. 3 illustrates the use of the housing under ideal conditions; that is, where the coating on the faces of the stator and on the surface portion 16 of the pole pieces is thin and uniform. As mentioned above, it is common practice to provide epoxy coatings which will be of nonuniform thickness and which may, in some areas, be quite thick; for example, 0.5 mm. Under such circumstances, the housing is assembled to the stator as explained above but by reason of the relatively thick coating of material on the surfaces 16, 50 the lower ends of the fingers 40 will not lodge against the surface 50 of the pole pieces. However, the fingers 40 will be flexed as shown in FIG. 5 and will bias the rib 30 against the surface 35 of the outer ring of the stator. Furthermore, the lower portion of the boss 46, that is, the reduced width portion, will lodge between adjacent ends 14 of the integral pole pieces and further stabilize the housing on the stator.

I claim:

1. In an electrical connector housing device of the type which is intended to be mounted on a stator and which has a prismatic terminal housing portion having a flat base, the base being intended to be positioned on one face of the stator, and the housing portion having at least one terminal-receiving cavity extending therein which is intended to receive a terminal for connection to a coil winding wire and a lead wire, the improvement to said housing means comprising:

a supporting rib extending laterally from one of the sidewalls of said terminal housing portion, said supporting rib having a supporting surface which extends normally of, and adjoins, said base, said supporting rib having a free end portion which is remote from said terminal housing portion, flexible clamping finger means extending from said free end portion of said rib, said finger means extending normally of the plane defined by said flat base and in the opposite direction from the direction of said terminal housing portion, the length of said rib being such that upon positioning said housing portion on one face of a stator with said supporting surface disposed against an internal surface of said stator, said free end of said rib will be located adjacent to the ends of adjacent pole sections of said stator and said finger means will extend through said stator and will serve to clamp said housing device to said stator.

2. A housing device as set forth in claim 1, said free end portion of said rib having a boss thereon which is dimensioned to be wedged between adjacent pole sections of said stator.

3. A housing device as set forth in claim 2 in which said clamping finger means has hooklike ends for engagement with portions of said adjacent pole members.

4. A housing device as set forth in claim 3 in which said finger means comprises three side-by-side fingers, the center one of said fingers being dimensioned to fit between adjacent pole pieces of said stator.

5. An electrical connector housing means which is intended to be mounted on a stator of the type comprising an outer ring and a plurality of pole sections within said ring, said pole sections being at spaced intervals around the interior of said ring, said housing means comprising:

a generally prismatic terminal housing portion having a flat base, and sidewalls extending from said base to an upper end, a plurality of terminal receiving cavities extending into said upper end, a supporting rib extending laterally from one of said sidewalls, said supporting rib having a supporting surface which extends normally of and adjoins, said base, said supporting rib having a free end portion which is remote from said terminal housing portion, and flexible clamping finger means extending from said free end portion of said rib, said clamping finger means extending in the opposite direction from the direction of said terminal housing whereby, said connector housing means can be assembled to a stator by positioning said base of said terminal housing porton on one face of said outer ring with said rib extending radially inwardly and between two adjacent pole sections of said stator so that said clamping finger means is wedged against said pole sections to clamp said housing means to said stator.

6. A housing means as set forth in claim 5, said free end portion of said rib having an enlarged end which is dimensioned to fit between adjacent pole sections.

7. A housing means as set forth in claim 6, said clamping finger means comprising clamping fingers having hook means on their ends and being dimensioned to be lodged against the surface portions of said pole members.